(12) United States Patent
Wilkerson, Jr. et al.

(10) Patent No.: US 11,664,834 B2
(45) Date of Patent: May 30, 2023

(54) FULLY INTEGRATED RADIO FREQUENCY TERMINAL SYSTEM

(71) Applicant: Smiths Interconnect, Inc., Tampa, FL (US)

(72) Inventors: James Allan Wilkerson, Jr., Oldsmar, FL (US); Shawn Kalen O'Brien, Saint Petersburg, FL (US); Scott Kempshall, Saint Petersburg, FL (US); Greg Lackmeyer, Thousand Oaks, CA (US)

(73) Assignee: SMITHS INTERCONNECT, INC., Tampa, FL (US)

( * ) Notice: Subject to any disclaimer, the term of this patent is extended or adjusted under 35 U.S.C. 154(b) by 0 days.

(21) Appl. No.: 16/469,123

(22) PCT Filed: Dec. 21, 2017

(86) PCT No.: PCT/US2017/067995
§ 371 (c)(1),
(2) Date: Jun. 12, 2019

(87) PCT Pub. No.: WO2018/119294
PCT Pub. Date: Jun. 28, 2018

(65) Prior Publication Data
US 2020/0028531 A1 Jan. 23, 2020

Related U.S. Application Data (60) Provisional application No. 62/438,371, filed on Dec. 22, 2016, provisional application No. 62/536,356, filed on Jul. 24, 2017.

(51) Int. Cl.
*H04B 1/04* (2006.01)
*H04B 1/40* (2015.01)

(52) U.S. Cl.
CPC ............. *H04B 1/0475* (2013.01); *H04B 1/40* (2013.01); *H04B 2001/0408* (2013.01); *H04B 2001/0491* (2013.01)

(58) Field of Classification Search
CPC ................... H04B 1/0475; H04B 1/40; H04B 2001/0408; H04B 2001/0491
See application file for complete search history.

(56) References Cited

U.S. PATENT DOCUMENTS 7,929,917 B1 * 4/2011 Morris ................... H04B 17/14
455/69
8,948,301 B2 * 2/2015 Rollins ................ H03F 1/3252
375/296

(Continued)

FOREIGN PATENT DOCUMENTS

| CN | 103931134 | 8/2011 |
|---|---|---|
| CN | 203071918 | 7/2013 |
| WO | WO 2011/097848 | 8/2011 |

*Primary Examiner* — Nguyen T Vo
(74) *Attorney, Agent, or Firm* — Snell & Wilmer LLP (57) ABSTRACT

An integrated radio frequency terminal system includes an integrated modem configured to receive user data and communicate user data to and from a user device. The integrated modem includes a transmit tuner configured to receive the user data and convert the user data from baseband to an intermediate frequency band. The integrated modem includes a receive tuner connected to the baseband modem device and configured to convert received incoming data in the intermediate frequency band to baseband and provide the converted incoming data to the baseband modem device. The system includes a power amplifier connected to the integrated modem and configured to convert the user data from the intermediate frequency band to a radio frequency band. The system includes a low noise amplifier connected (Continued)

to the integrated modem and configured to convert received incoming data from the radio frequency band to the intermediate frequency band.

6 Claims, 5 Drawing Sheets

(56) References Cited

U.S. PATENT DOCUMENTS

| | | | |
|---|---|---|---|
| 2002/0102948 A1 | 8/2002 | Stanwood et al. | |
| 2002/0137514 A1 | 9/2002 | Mitsugi et al. | |
| 2004/0021497 A1 | 2/2004 | Beland | |
| 2005/0052245 A1 | 3/2005 | Rofougaran | |
| 2005/0136879 A1 | 6/2005 | Khorram | |
| 2008/0095264 A1* | 4/2008 | Deng | H03F 1/3241 |
| | | | 375/296 |
| 2008/0119158 A1 | 5/2008 | Filipovic et al. | |
| 2009/0170452 A1 | 7/2009 | Rubin et al. | |
| 2010/0034317 A1 | 2/2010 | Nejah | |
| 2010/0166123 A1* | 7/2010 | Pellon | H03B 28/00 |
| | | | 375/344 |
| 2010/0220810 A1* | 9/2010 | Jin | H04L 27/368 |
| | | | 375/296 |
| 2010/0238849 A1* | 9/2010 | Klein | H04B 1/0458 |
| | | | 370/297 |
| 2010/0267418 A1* | 10/2010 | Toon | H04L 63/0853 |
| | | | 455/558 |
| 2010/0284323 A1* | 11/2010 | Tang | H04B 3/548 |
| | | | 370/321 |
| 2011/0053536 A1* | 3/2011 | Friedmann | H03D 7/161 |
| | | | 455/207 |
| 2011/0258618 A1 | 10/2011 | Capuozzo et al. | |
| 2013/0101066 A1 | 4/2013 | Dick | |
| 2013/0136039 A1 | 5/2013 | Sturkovich et al. | |
| 2013/0136163 A1* | 5/2013 | Friedmann | H04W 88/085 |
| | | | 375/220 |
| 2013/0194977 A1* | 8/2013 | Lakhani | H04L 5/143 |
| | | | 370/277 |
| 2013/0243121 A1* | 9/2013 | Bai | H03F 3/245 |
| | | | 375/297 |
| 2014/0029598 A1* | 1/2014 | Tsay | H04L 12/2834 |
| | | | 370/338 |
| 2014/0247906 A1* | 9/2014 | Pang | H03F 1/3258 |
| | | | 375/297 |
| 2015/0031318 A1* | 1/2015 | McCallister | H03F 1/0222 |
| | | | 455/114.3 |
| 2016/0127119 A1 | 5/2016 | Anantharaman Chandrasekarapuram | H04B 1/1027 |
| | | | 375/371 |
| 2016/0204809 A1* | 7/2016 | Pratt | H03F 1/3223 |
| | | | 375/219 |
| 2019/0089419 A1 | 3/2019 | Kim et al. | |
| 2019/0312613 A1* | 10/2019 | Guan | H03F 3/68 |

* cited by examiner

FULLY INTEGRATED RADIO FREQUENCY TERMINAL SYSTEM

CROSS-REFERENCE TO RELATED APPLICATIONS

This application claims the benefit and priority of U.S. Provisional Patent Application No. 62/438,371, titled "Fully Integrated Radio Frequency System" and filed on Dec. 22, 2016, and also claims the benefit and priority of U.S. Provisional Patent Application No. 62/536,356, titled "Fully Integrated RF Terminal" and filed on Jul. 24, 2017, the entire contents of both are hereby incorporated by reference herein.

BACKGROUND

1. Field

The present disclosure generally relates radio frequency communication systems.

2. Description of the Related Art

Radio frequency communication systems have evolved on architecture based on the limits of contemporary hardware design. This has resulted in systems that do not take full advantage of advances in radio frequency and digital circuit integration and miniaturization. In particular, digital modulation and demodulation (modem) functions have traditionally been separated from radio frequency conversion and amplification functions. This allowed the previously large and complex modem functions to reside at the user end of the system in a more protected environment.

Conventionally, only those functions which required low loss direct connection to the antenna (e.g., transmission power amplifier, receive low noise amplifier) were placed at the antenna. The interface between modem and antenna electronics was accomplished with fixed tuned block converters mounted near the antenna to convert the high radio frequency frequencies to a lower intermediate frequency band. Relatively long broadband intermediate frequency cables provided the link between antenna mounted electronics and the modem.

This architecture was created when a modem was implemented as a large chassis full of analog and digital electronics, but has significant disadvantages. Accordingly, there is a need for an improved system.

SUMMARY

Disclosed herein is an integrated radio frequency terminal system. The system includes an integrated modem. The integrated modem includes a baseband modem device configured to receive user data and communicate user data to and from a user device via a digital interface cable. The integrated modem also includes a transmit tuner connected to the baseband modem device and configured to receive the user data and convert the user data from baseband to an intermediate frequency band. The integrated modem also includes a receive tuner connected to the baseband modem device and configured to convert received incoming data in an intermediate frequency band to baseband and provide the converted incoming data to the baseband modem device. The system also includes a power amplifier connected to the integrated modem and configured to convert the user data from the intermediate frequency band to a radio frequency band. The system also includes a low noise amplifier connected to the integrated modem and configured to convert received incoming data from the radio frequency band to the intermediate frequency band.

Also disclosed is an integrated radio frequency terminal system. The system includes an integrated modem. The integrated modem includes a baseband modem device configured to receive user data and communicate user data to and from a user device via a digital interface cable. The integrated modem includes a transmit tuner connected to the baseband modem device and configured to receive the user data and convert the user data from baseband to a radio frequency band without converting to an intermediate frequency band. The integrated modem includes a receive tuner connected to the baseband modem device and configured to convert received incoming data in the radio frequency band to baseband without converting to an intermediate frequency band and provide the converted incoming data to the baseband modem device. The system includes an antenna device connected to the integrated modem and configured to transmit the user data in the radio frequency band and receive the incoming data in the radio frequency band.

Also disclosed is a method of transmitting user data. The method includes receiving, by an integrated modem located proximal to an antenna device, user data in baseband frequency. The method also includes converting, by the integrated modem, the user data from baseband frequency to radio frequency. The method also includes receiving, by the antenna device, the converted user data. The method also includes transmitting, by the antenna device, the converted user data in radio frequency.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Conventionally, digital modulation and demodulation (modem) functions are separated from radio frequency conversion and amplification functions. This allows the previously large and complex modem functions to reside at the user end of the system in a more protected environment. Accordingly, only those functions which required low loss direct connection to the antenna (e.g., transmission power amplifier and receive low noise amplifier) were placed at the antenna. The interface between modem and antenna electronics was accomplished with fixed tuned block converters mounted near the antenna to convert the high radio frequency frequencies to a lower intermediate frequency band. Long broadband intermediate frequency cables provided the link between antenna mounted electronics and the modem.

However, when a modem is capable of being implemented as a single integrated circuit, this conventional architecture becomes unnecessary and has important disadvantages. Use of a fixed broadband intermediate frequency link and separate modem within the conventional radio frequency terminals increases cost and imposes performance limitations. The system described herein integrates all radio frequency functions and modem functions within the terminal to mitigate these disadvantages. By integrating all radio frequency functions and modem functions, intermediate frequency cable links may be removed, and the resulting integrated system may be capable of improved performance. In addition, the system described herein improves size, weight, and power requirements of the system, when compared to conventional systems.

Figure 1:
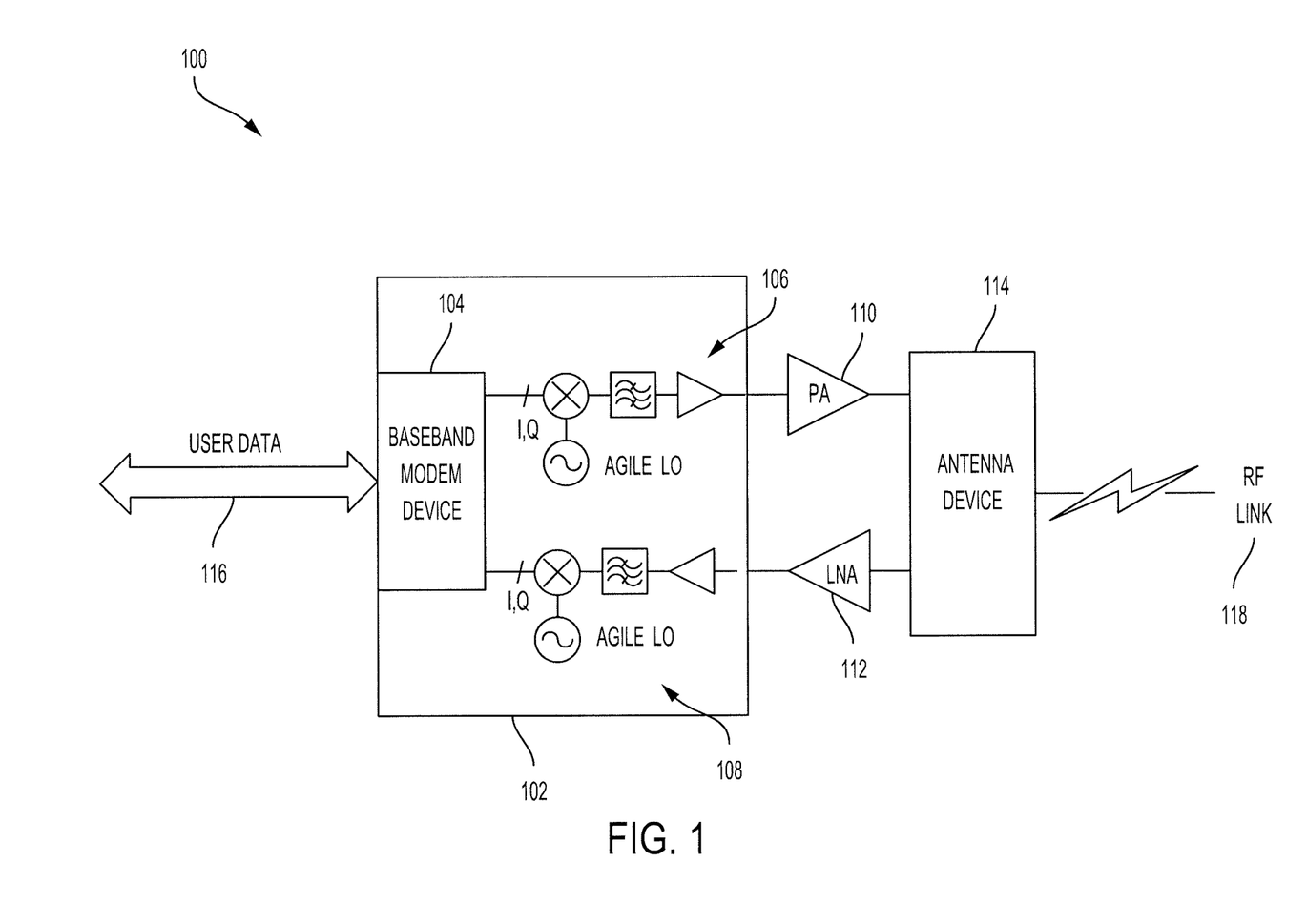
FIG. 1 is an integrated radio frequency terminal system using intermediate frequency conversion according to an embodiment of the present disclosure.

FIG. 1 illustrates an example embodiment of the fully integrated radio frequency terminal system, according to an embodiment of the present disclosure.

The fully integrated radio frequency terminal system 100 includes an integrated modem 102, a power amplifier 110, a low noise amplifier 112, and an antenna device 114. The integrated modem 102, the power amplifier 110, and the low noise amplifier 112 may be physically located outside and proximal to the antenna device 114. For example, the integrated modem 102, the power amplifier 110, and the low noise amplifier 112 may be located within several feet of the antenna device 114 or may share a common housing. This is different from a conventional system, where a modem is located proximal to the user device, a radio frequency (RF) assembly is located proximal to the antenna device, and intermediate frequency (IF) cables are run between the modem and the RF assembly. These intermediate frequency cables, commonly operating in L-band, may be long and may cause mixer spur issues, as a relatively wide bandwidth must be used. Standardized intermediate frequency bands may also cause issues for some radio frequency bands due to location of higher order mixer spurious products and force use of more conversion stages. Use of L-band also results in difficult mixer spurious issues in IF to Ku (or other frequency) conversion due to wide intermediate frequency bandwidth (BW) (up to 950 to 1700 MHz for wide band TX, up to 950 to 2750 for wideband RX). The L-band systems may involve difficult filters and/or spur cancellation. In addition, L-Band cable losses and frequency response degrade system performance and force wider TX and RX dynamic range to compensate for cable loss variation. Long cable runs may include more expensive low loss cable, in some installations.

Figure 4:
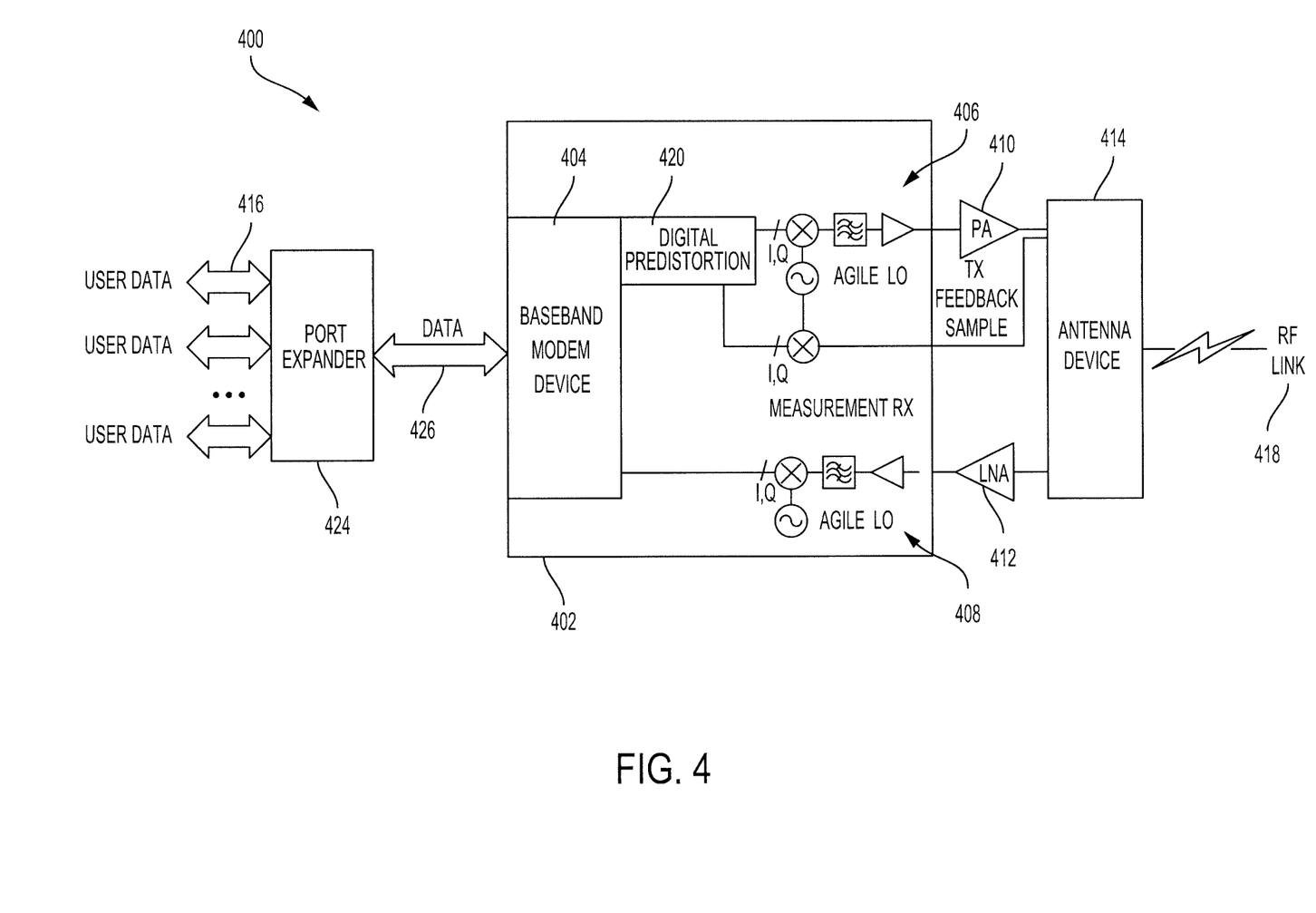
FIG. 4 is an integrated radio frequency terminal system using a port expander according to an embodiment of the present disclosure.

In some embodiments, the integrated modem 102, the power amplifier 110, and the low noise amplifier 112 are within a single housing. In other embodiments, the integrated modem 102 is within a first housing and the power amplifier 110 and the low noise amplifier 112 are within a second housing. In some embodiments, some or all of the antenna device 114 is in the same housing as the integrated modem 102. In many embodiments, the integrated modem 102, the power amplifier 110, and the low noise amplifier 112 are within a housing located outdoors, and the digital interface cable facilitating transmission of the user data 116 terminates indoors, to a user device or a port expander (as shown in FIG. 4). The user device may be a processor, a router and/or a computing device.

The integrated modem 102 includes a baseband modem device 104 configured to receive a baseband signal of user data 116. The user data 116 may be sent to the integrated modem 102 via a digital interface cable, which does not affect transmission performance. Because the integrated modem 102 is located proximal to the antenna device 114, the digital interface cable may be longer than in previous conventional systems, and the length of the digital interface cable may vary based on context and application. However, cable loss for digital signals is lower than for intermediate frequency cables, so longer cable runs (using digital interface cables versus intermediate frequency cables) are possible without performance deterioration. While digital interface cables are described as being used herein, any digital link approach, including fiber optics, may be used to communicate user data 116. Power for the system may be sourced near the antenna device 114 or via a separate power cable.

The integrated modem 102 also includes a transmit tuner 106 and a receive tuner 108. The transmit tuner 106 tunes a received baseband signal and converts the baseband signal to an intermediate frequency. The intermediate frequency may be any frequency between the baseband frequency and the radio frequency used by the antenna device 114.

The intermediate frequency signal is then provided to a power amplifier 110, which converts the intermediate frequency signal to the radio frequency band signals. The radio frequency band signals may have a radio frequency anywhere in the electromagnetic spectrum. In some embodiments, the radio frequency band signals are in the Ku band or higher. The antenna device 114 receives the radio frequency band signals and transmits them via an RF link 118. The RF link 118, as used herein, refers to the space between two antenna systems exchanging data (e.g., the antenna device 114 and a corresponding antenna device communicating with the antenna device 114).

The application of the user data transmission may be digitally configured and adjusted without modifying the physical components of the system 100. For example, the user data may be transmitted using satellite communications or may be transmitted using terrestrial communications by configuring the transmit tuner 106. The transmit tuner 106 includes a local oscillator, which may be an adjustable, agile local oscillator configured to provide any number of different waveforms. Thus, the system 100 is not limited to one type of communications. Accordingly, the receive tuner 108 also may have an adjustable, agile local oscillator.

In some embodiments, as shown in FIG. 1, the transmit tuner 106 and the receive tuner 108 also include a mixer and a bandpass filter.

The antenna device 114 may receive data from via the RF link 118 in the radio frequency band, and the antenna device 114 may provide the received data to the low noise amplifier 112 for converting down to an intermediate frequency. The converted data is provided to the receive tuner 108 for further conversion down to baseband, so that the data can be passed to the user device via the baseband modem device 104.

The system 100 converts the baseband to the radio frequency band in two steps: once from the baseband to the intermediate frequency and once from the intermediate frequency to the radio frequency. The intermediate frequency used does not require a high level of bandwidth, as compared to previous systems, as the integrated modem 102 is located nearby the antenna device 114, and lengthy intermediate frequency cable runs are not used. This reduction in bandwidth used eliminates many of the issues present in conventional systems. By having the various components of the system located proximal to the antenna device 114, the system is made more efficient, more compact, cheaper to produce, easier to maintain, and lighter.

Figure 2:
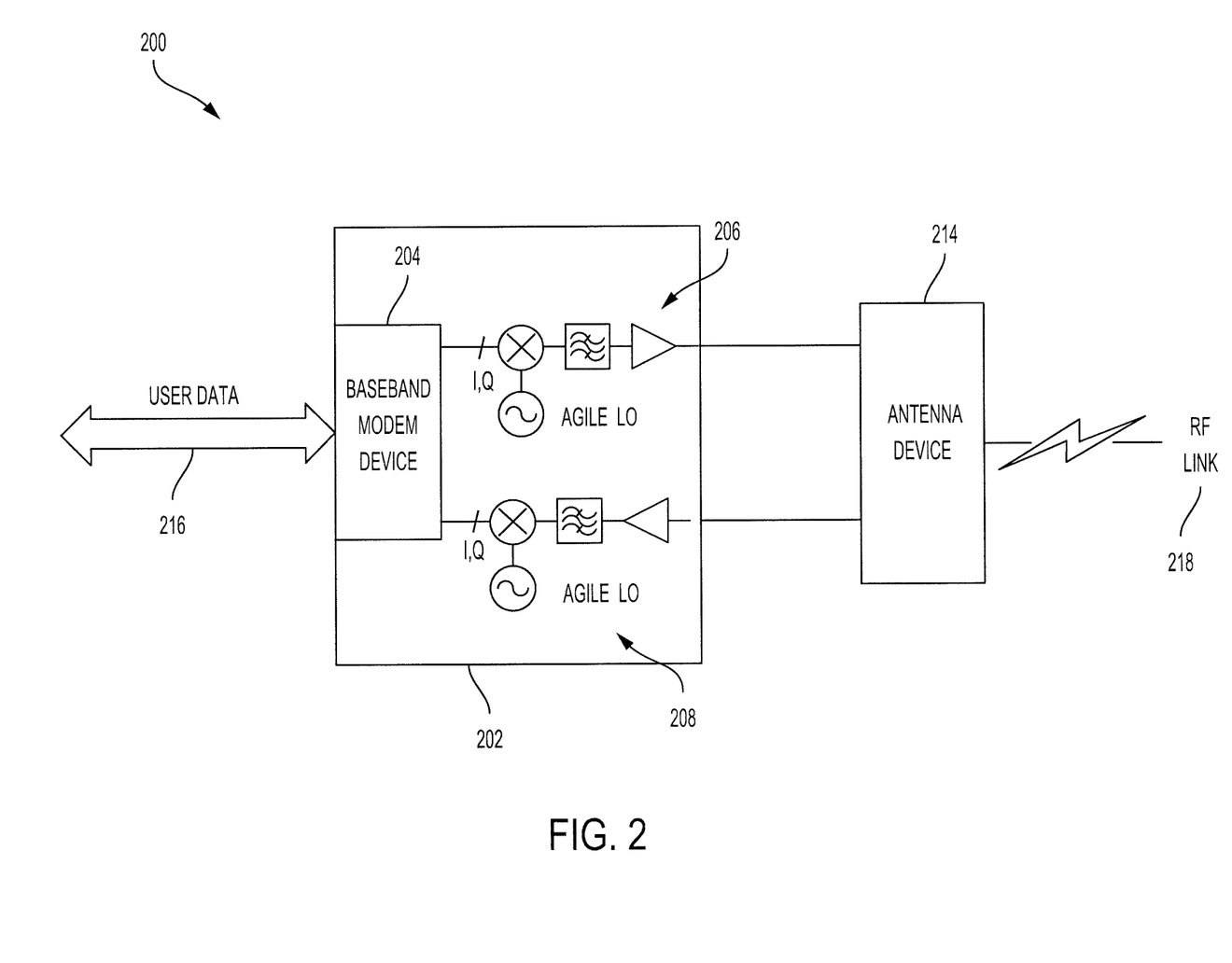
FIG. 2 is an integrated radio frequency terminal system using direct conversion according to an embodiment of the present disclosure.

FIG. 2 illustrates an example embodiment of the fully integrated radio frequency terminal system, according to an embodiment of the present disclosure.

The system 200 is similar to the system 100, and like parts are numbered similarly. The system 200 includes an integrated modem 202 located proximal to an antenna device 214. The integrated modem 202 has a baseband modem device 204 configured to transmit and receive user data 216 to and from a user device. The user device may be a processor, a router or a computing device.

The user data 216 received by the integrated modem 202 via the baseband modem device 204 is converted from the baseband to the radio frequency band. This conversion may be accomplished by a transmit tuner 206 or a block upconverter. In some embodiments, a solid state power amplifier is also used. The antenna device 214 receives the user data 216 in radio frequency band, and transmits it via the RF link 218.

The antenna device 214 receives data via the RF link 218 and transmits it to the integrated modem 202. The received data is converted from the radio frequency band to the baseband. This conversion may be accomplished by a receive tuner 208 or a low noise block downconverter. The baseband modem device 204 receives the data converted to baseband and provides the data to the user device.

The integrated modem 202 is located proximal to the antenna device 214 and away from the user device. As a result, the user data 216 is transmitting along a relatively long digital interface cable. As described herein, cable loss for digital signals is lower than for intermediate frequency cables, so longer cable runs are possible without performance deterioration. While digital interface cables are described as being used herein, any digital link approach, including fiber optics, may be used to communicate user data 216. As described herein, the long digital interface cable being used is preferable to the conventional systems where a long intermediate frequency cable is used. The system 200 minimizes radio frequency losses for best transmission (TX) power efficiency and receiving (RX) noise figure.

The system provides a single conversion TX and RX paths (baseband to/from Ku Band). Passive TX reject (in RX path) and RX reject (in TX path) filters and other antenna components may change with application, but electronics are agile across approximately 1 octave bandwidth, limited by local oscillator tuning range and quadrature hybrid performance.

Added modem functions may be achieved with less size, weight, and power (SWaP) than is gained by simplifying the TX and RX radio frequency chains, so net SWaP of antenna mounted components is reduced when compared to L-Band intermediate frequency systems. The total cost of the system may be reduced by elimination of separate component assemblies.

The system encounters no mixer spurious issues, since wideband intermediate frequency transmission is eliminated. Baseband filtering and pre-distortion are used to meet TX spectrum requirements. RX selectivity is achieved with baseband filtering. Filtering and pre-distortion (as illustrated in FIGS. 3 and 4) can be implemented digitally.

The system 200 performs the same functions as the system 100, but the system 200 does not convert the baseband to any intermediate frequency, but rather converts the baseband directly to the radio frequency band. Depending on the cost of various internal components described herein, the most cost effective solution among the various embodiments of the system may change, but all embodiments of the system are preferable to the conventional system, for the reasons described herein.

Similar to the system 100, the application of the user data transmission may be digitally configured and adjusted without modifying the physical components of the system 200. For example, the user data may be transmitted using satellite communications or may be transmitted using terrestrial communications by configuring the transmit tuner 206, which includes an adjustable, agile local oscillator configured to provide any number of different waveforms. Thus, the system 200 is not limited to one type of communications. Accordingly, the receive tuner 208 also may have an adjustable, agile local oscillator. In some embodiments, as shown in FIG. 2, the transmit tuner 206 and the receive tuner 208 also include a mixer and a bandpass filter.

Figure 3:
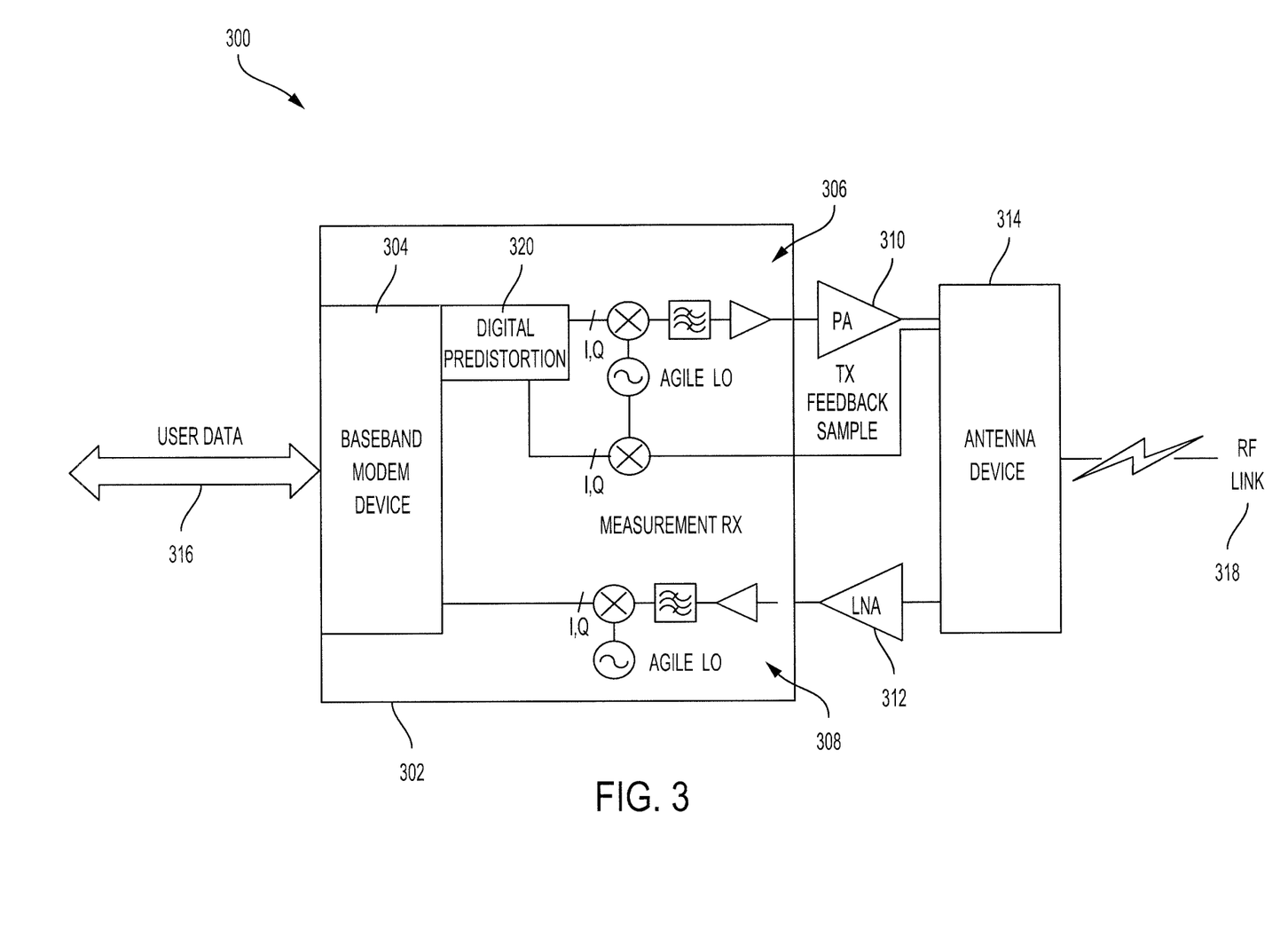
FIG. 3 is an integrated radio frequency terminal system using a digital predistortion device according to an embodiment of the present disclosure.

FIG. 3 illustrates an example embodiment of the fully integrated radio frequency terminal system, according to an embodiment of the present disclosure. The system 300 is similar to the system 100 and the system 200, and like parts are numbered similarly.

The system 300 includes an integrated modem 302, a power amplifier 310, a low noise amplifier 312, and an antenna device 314. The integrated modem 302, the power amplifier 310, and the low noise amplifier 312 may be physically located proximal to the antenna device 314. As described herein, this is different from a conventional system, where a modem is located proximal to the user device, a radio frequency assembly is located proximal to the antenna device, and IF cables connect the modem and the radio frequency assembly.

In some embodiments, the integrated modem 302, the power amplifier 310, and the low noise amplifier 312 are within a single housing. In other embodiments, the integrated modem 302 is within a first housing and the power amplifier 310 and the low noise amplifier 312 are within a second housing. In some embodiments, some or all of the antenna device 314 is in the same housing as the integrated modem 302.

The integrated modem 302 includes a baseband modem device 304 configured to receive a baseband signal of user data 316 and transmit a baseband signal of user data 316. The user data 316 may be sent to the integrated modem 302 via a digital interface cable, which does not affect transmission performance. While digital interface cables are described as being used herein, any digital link approach, including fiber optics, may be used to communicate user data 316. Power for the system may be sourced near the antenna device 314 or via a separate power cable.

The integrated modem 302 includes a digital predistortion device 320 configured to reduce distortion of the user data 316 as it is processed for transmission by the antenna device 314. The digital predistortion device 320 receives a sample of the data signal after it is converted to the radio frequency band by the transmit tuner 306 and the power amplifier 310, and the digital predistortion device compensates for distortion detected in the sample, such that distortion in subsequent data is reduced.

The integrated modem 302 also includes a transmit tuner 306 and a receive tuner 308. The transmit tuner 306 tunes a received, digitally predistorted baseband signal and converts the baseband signal to an intermediate frequency. The intermediate frequency signal is then provided to a power amplifier 310, which converts the intermediate frequency signal to the radio frequency band signals. The antenna device 314 receives the radio frequency band signals and transmits them via an RF link 318.

The antenna device 314 may receive data via the RF link 318 in the radio frequency band, and the antenna device 314 may provide the received data to the low noise amplifier 312 for converting down to an intermediate frequency. The converted data is provided to the receive tuner 308 for further conversion down to baseband, so that the data can be passed to the user device via the baseband modem device 304.

Similar to the system 100, the system 300 converts the baseband to the radio frequency band (and back) in two steps: once from the baseband to the intermediate frequency and once from the intermediate frequency to radio frequency. The intermediate frequency used does not require a high level of bandwidth, as compared to previous systems, as the integrated modem 302 is located nearby the antenna device 314, and lengthy intermediate frequency cable runs are not used. By having the various components of the system located proximal to the antenna device 314, the system is made more efficient, more compact, cheaper to produce, easier to maintain, and lighter.

Similar to the systems 100 and 200, the application of the user data transmission may be digitally configured and adjusted without modifying the physical components of the system 300. For example, the user data may be transmitted using satellite communications or may be transmitted using terrestrial communications by configuring the transmit tuner 306, which includes an adjustable, agile local oscillator configured to provide any number of different waveforms. Thus, the system 300 is not limited to one type of communications. Accordingly, the receive tuner 308 also may have an adjustable, agile local oscillator. In some embodiments, as shown in FIG. 3, the transmit tuner 306 and the receive tuner 308 also include a mixer and a bandpass filter.

FIG. 4 illustrates an example embodiment of the fully integrated radio frequency terminal system, according to an embodiment of the present disclosure. The system 400 is similar to the system 100, the system 200, and the system 300, and like parts are numbered similarly.

The system 400 includes an integrated modem 402, a power amplifier 410, a low noise amplifier 412, and an antenna device 414. The integrated modem 402, the power amplifier 410, and the low noise amplifier 412 may be physically located proximal to the antenna device 414. As described herein, this is different from a conventional system, where a modem is located proximal to the user device, a radio frequency assembly is located proximal to the antenna device, and intermediate frequency cables are run between the modem and the radio frequency assembly.

In some embodiments, the integrated modem 402, the power amplifier 410, and the low noise amplifier 412 are within a single housing. In other embodiments, the integrated modem 402 is within a first housing and the power amplifier 410 and the low noise amplifier 412 are within a second housing. In some embodiments, some or all of the antenna device 414 is in the same housing as the integrated modem 402.

The integrated modem 402 includes a baseband modem device 404 configured to receive a baseband signal of user data and transmit a baseband signal of user data. The user data may be sent to the integrated modem 402 via a digital interface cable, which does not affect transmission performance. While digital interface cables are described as being used herein, any digital link approach, including fiber optics, may be used to communicate user data.

The user data 416 from a plurality of user devices may be received by a port expander 424. The port expander 424 may receive a plurality of data streams and transmit the plurality of data streams as a single data stream (e.g., data 426) to a single recipient (e.g., the integrated modem 402). In addition, the port expander 424 may receive a data stream from a single source (e.g., the integrated modem 402) and may separate the data stream into a plurality of data streams (e.g., user data 416). By incorporating the port expander 424, more user devices may have access to the system 400 for transmitting and receiving data.

The port expander 424 may be located proximal to the integrated modem 402, such that the data 426 travels through a relatively short digital interface cable and the user data 416 travels through a relatively long digital interface cable. Alternatively, the port expander 424 may be located away from the integrated modem 402, such that the data 426 travels through a relatively long digital interface cable.

The integrated modem 402 includes a digital predistortion device 420 configured to reduce distortion of the user data 416 as it is processed for transmission by the antenna device 414. The digital predistortion device 420 receives a sample of the data signal after it is converted to the radio frequency band by the transmit tuner 406 and the power amplifier 410, and the digital predistortion device 420 compensates for distortion detected in the sample, such that distortion in subsequent data is reduced.

The integrated modem 402 also includes a transmit tuner 406 and a receive tuner 408. The transmit tuner 406 tunes a received, digitally predistorted baseband signal and converts the baseband signal to an intermediate frequency. The intermediate frequency signal is then provided to a power amplifier 410, which converts the intermediate frequency signal to the radio frequency band signals. The antenna device 314 receives the radio frequency band signals and transmits them via an RF link 418.

The antenna device 414 may receive data via the RF link 318 in the radio frequency band, and the antenna device 414 may provide the received data to the low noise amplifier 412 for converting down to an intermediate frequency. The converted data is provided to the receive tuner 308 for further conversion down to baseband, so that the data can be passed to the user device via the baseband modem device 404.

Similar to the system 100 and the system 300, the system 400 converts the baseband to the radio frequency band (and back) in two steps: once from the baseband to the intermediate frequency and once from the intermediate frequency to the radio frequency. The intermediate frequency used does not require a high level of bandwidth, as compared to previous systems, as the integrated modem 402 is located nearby the antenna device 414, and lengthy intermediate frequency cable runs are not used. By having the various components of the system located proximal to the antenna device 414, the system is made more efficient, more compact, cheaper to produce, easier to maintain, and lighter.

Similar to the systems 100, 200, and 300 the application of the user data transmission may be digitally configured and adjusted without modifying the physical components of the system 400. For example, the user data may be transmitted using satellite communications or may be transmitted using terrestrial communications by configuring the transmit tuner 406, which includes an adjustable, agile local oscillator configured to provide any number of different waveforms. Thus, the system 400 is not limited to one type of communications. Accordingly, the receive tuner 408 also may have an adjustable, agile local oscillator. In some embodiments, as shown in FIG. 4, the transmit tuner 406 and the receive tuner 408 also include a mixer and a bandpass filter.

The systems described herein (e.g., the system 100, the system 200, the system 300, and the system 400) are usable with any antenna type.

Figure 5:
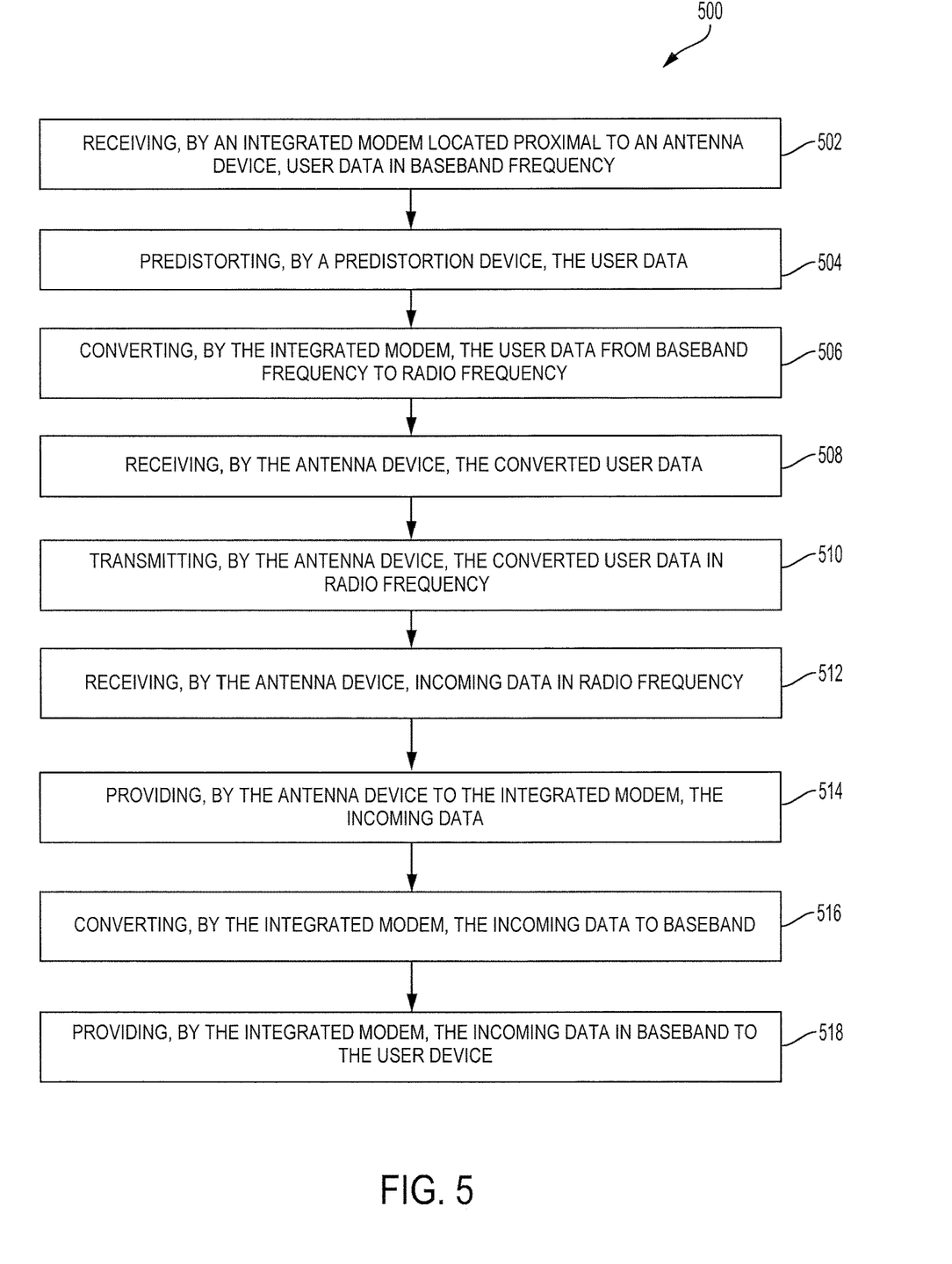
FIG. 5 is a flowchart of a process of the integrated radio frequency terminal system according to an embodiment of the present disclosure.

FIG. 5 illustrates a flowchart of a process of the integrated radio frequency terminal system.

The process 500 begins with an integrated modem (e.g., integrated modem 102, 202, 302, 402) receiving user data (e.g., user data 116, 216, 316, 416) in baseband frequency (step 502). As described herein, the user data may be received from a user device. The user device may be located indoors and the integrated modem may be located outdoors, proximal to the antenna device.

A predistortion device (e.g., digital predistortion device 320, 420) predistorts the user data in baseband frequency (step 504). By predistorting the user data, the transmitted radio frequency data may be made clearer.

The integrated modem converts the user data from a baseband frequency to a radio frequency (step 506). The radio frequency may be in the Ku band or higher. The integrated modem may convert the user data from the baseband frequency to the radio frequency either in one step or in two steps, from the baseband frequency to an intermediate frequency, and from an intermediate frequency to the radio frequency, as described herein. The intermediate frequency may be any frequency between the baseband frequency and the radio frequency.

An antenna device (e.g., antenna device 114, 214, 314, 414) receives the converted user data (step 508). The converted user data is in radio frequency and the antenna device transmits the converted user data (step 510).

The antenna device may receive incoming data in radio frequency (step 512). The antenna device provides the incoming data to the integrated modem (step 514). The integrated modem converts the incoming data to the baseband frequency (step 516). The integrated modem may convert the incoming data to the baseband frequency in one step or in two steps, from the radio frequency to the intermediate frequency, and from the intermediate frequency to the baseband frequency. The integrated modem then provides the incoming data in the baseband frequency to the user device (step 518).

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An integrated radio frequency terminal system comprising:
  an integrated modem configured to modulate or demodulate data for transmission, the integrated modem including:
    a baseband modem device configured to receive a baseband signal of user data from a user device and communicate with the user device in baseband via a digital interface cable,
    a transmit tuner connected to the baseband modem device and configured to receive the baseband signal of user data and convert the baseband signal of user data from baseband to a radio frequency band without converting to an intermediate frequency band, the transmit tuner including an agile local oscillator configured to enable the user data to be transmitted using satellite communications or terrestrial communications, and
    a receive tuner connected to the baseband modem device and configured to convert received incoming data in the radio frequency band to baseband without converting to the intermediate frequency band and provide the converted incoming data to the baseband modem device;
  a digital predistortion device connected to the baseband modem device and the transmit tuner, and configured to digitally predistort the user data and provide the digitally predistorted user data in baseband directly to the transmit tuner, the digital predistortion being based on a sample from the transmit tuner in the radio frequency band; and
  an antenna device connected to the integrated modem and configured to transmit the user data in the radio frequency band and receive the incoming data in the radio frequency band.

2. The integrated radio frequency terminal system of claim 1, wherein the integrated modem is configured to be located outdoors and proximal to the antenna device.

3. The integrated radio frequency terminal system of claim 1, wherein the radio frequency is in the Ku band or higher.

4. The integrated radio frequency terminal system of claim 1, further comprising a port expander connected to the digital interface cable, the port expander configured to receive respective user data for a plurality of user devices.

5. A method of transmitting user data, the method comprising:
  receiving, by a baseband modem device of an integrated modem located proximal to an antenna device, a baseband signal of user data from a user device in baseband frequency;
  predistorting, by a digital predistortion device, the user data in baseband frequency, the predistorting being based on a sample in radio frequency band from a transmit tuner of the integrated modem;
  receiving, by the transmit tuner of the integrated modem directly from the digital predistortion device, the baseband signal of user data from the baseband modem device;
  converting, by the transmit tuner of the integrated modem, the user data from baseband frequency to the radio frequency band without converting to an intermediate frequency band;
  enabling, by an agile local oscillator of the transmit tuner of the integrated modem, the user data to be transmitted from the integrated modem using satellite communications or terrestrial communications;

receiving, by the antenna device, the converted user data;
transmitting, by the antenna device, the converted user data in the radio frequency band;
receiving, by the antenna device, incoming data in the radio frequency band;
converting, by a receive tuner of the integrated modem, the received incoming data in the radio frequency band to baseband frequency without converting to the intermediate frequency band; and
providing, by the receive tuner, the converted incoming data to the baseband modem device.

6. The method of claim 5, wherein the radio frequency is in the Ku band or higher.

* * * * *